(12) United States Patent
Carkner (10) Patent No.: US 11,680,777 B2
(45) Date of Patent: Jun. 20, 2023

(54) ARMOR PLATE SYSTEM (71) Applicant: Galvion Ltd., Portsmouth, NH (US)

(72) Inventor: Steve Carkner, Ottawa (CA)

(73) Assignee: Galvion Ltd., Portsmouth, NH (US)

(*) Notice: Subject to any disclaimer, the term of this patent is extended or adjusted under 35 U.S.C. 154(b) by 412 days.

(21) Appl. No.: 16/439,451

(22) Filed: Jun. 12, 2019

(65) Prior Publication Data

US 2019/0383583 A1 Dec. 19, 2019

Related U.S. Application Data (60) Provisional application No. 62/685,835, filed on Jun. 15, 2018.

(51) Int. Cl.
*F41H 5/02* (2006.01)
*F41H 5/04* (2006.01)
*B06B 1/06* (2006.01)
*H04R 17/00* (2006.01)

(52) U.S. Cl.
CPC ........... *F41H 5/0414* (2013.01); *B06B 1/064* (2013.01); *H04R 17/00* (2013.01)

(58) Field of Classification Search
CPC .......... G01H 17/00; G01H 15/00; G01H 1/00; G01H 1/12; F41H 5/02; F41H 5/0414; F41H 5/06; F41H 5/08
See application file for complete search history.

(56) References Cited

U.S. PATENT DOCUMENTS

| | | | |
|---|---|---|---|
| 4,593,569 A | 6/1986 | Joy | |
| 6,332,390 B1 | 12/2001 | Lyons | |
| 6,399,939 B1* | 6/2002 | Sundaresan | G01H 1/12 250/231.1 |
| 6,599,288 B2 | 7/2003 | Maguire et al. | |
| 7,180,302 B2 | 2/2007 | Kelsey et al. | |
| 7,921,757 B1 | 4/2011 | Vavrick et al. | |
| 8,046,177 B2* | 10/2011 | Liu | G01N 29/4463 702/35 |
| 8,087,339 B2 | 1/2012 | Mann et al. | |
| 8,265,889 B2 | 9/2012 | Qing et al. | |

(Continued)

FOREIGN PATENT DOCUMENTS

| | | |
|---|---|---|
| GB | 951277 A1 | 3/1964 |
| JP | 2008-196926 A | 8/2008 |

(Continued)

OTHER PUBLICATIONS

International Preliminary Report on Patentability for International Application No. PCT/US2019/036749, dated Dec. 24, 2020.

(Continued)

*Primary Examiner* — J. Woodrow Eldred
(74) *Attorney, Agent, or Firm* — Wolf, Greenfield & Sacks, P.C.

(57) ABSTRACT

An armor plate system includes an integrated damage detector which may permit field testing of an armor plate. The system includes a ceramic plate and a piezoelectric transducer attached to lateral face of the ceramic plate. The piezoelectric transducer may apply a signal to the ceramic plate and receive a reflected signal. The applied signal may form a compression wave. An ultrasonic signal may be applied.

18 Claims, 10 Drawing Sheets

(56) References Cited

U.S. PATENT DOCUMENTS

| | | |
|---|---|---|
| 8,333,140 B2 | 12/2012 | Meitzler et al. |
| 8,352,201 B2 | 1/2013 | Qing et al. |
| 8,695,476 B2 | 4/2014 | Kucherov et al. |
| 8,752,432 B2 | 6/2014 | Meitzler et al. |
| 10,429,253 B2 * | 10/2019 | Carkner ................ F41H 5/0414 |
| 11,060,993 B2 | 7/2021 | Redinger et al. |
| 2002/0075189 A1 | 6/2002 | Carillo, Jr. et al. |
| 2003/0101007 A1 | 5/2003 | Dubois et al. |
| 2006/0169046 A1 | 8/2006 | Gordon et al. |
| 2009/0027229 A1 | 1/2009 | Fortson et al. |
| 2009/0043516 A1 | 2/2009 | Liu et al. |
| 2010/0050308 A1 | 3/2010 | Roberson et al. |
| 2011/0035167 A1 | 2/2011 | Qing et al. |
| 2012/0235693 A1 | 9/2012 | Feng |
| 2013/0000408 A1 | 1/2013 | Meitzler et al. |
| 2013/0030727 A1 | 1/2013 | Zalameda et al. |
| 2013/0043888 A1 | 2/2013 | Soar |
| 2013/0213137 A1 | 8/2013 | Ostapenko |
| 2017/0167927 A1 | 6/2017 | Carkner |
| 2017/0245764 A1 | 8/2017 | Carkner |
| 2017/0276651 A1 * | 9/2017 | Hall ................ A61B 8/4254 |
| 2019/0346395 A1 | 11/2019 | Redinger et al. |

FOREIGN PATENT DOCUMENTS

| | | |
|---|---|---|
| WO | WO 2006/103400 A1 | 10/2006 |
| WO | WO 2011/134068 A1 | 11/2011 |
| WO | WO 2017/042528 A1 | 3/2017 |

OTHER PUBLICATIONS

Invitation to Pay Additional Fees for International Application No. PCT/US2019/036749, dated Feb. 19, 2020.

International Search Report and Written Opinion for International Application No. PCT/US2019/036749, dated May 22, 2020.

\* cited by examiner

ARMOR PLATE SYSTEM

RELATED APPLICATION

This application claims the benefit under 35 U.S.C. § 119(e) to U.S. Provisional Application Ser. No. 62/685,835, entitled "ARMOR PLATE SYSTEM", filed on Jun. 15, 2018, which is hereby incorporated by reference in its entirety.

FIELD

Disclosed embodiments are related to devices used to detect damage or abnormalities in an armor plate.

DISCUSSION OF THE RELATED ART

Armor is generally composed of multiple ballistic materials that work in combination to inhibit the penetration of projectiles or otherwise mitigate impact forces. Typically, ballistic armor plates include one or more ceramic plates which effectively absorb the energy from a projectile by fracturing. These ceramic plates generally have a backing layer of ultra-high molecular weight plastic, often with fiber reinforcement, which assists in stopping any projectile fragments. The armor plates may have a soft backing material that provides comfort to the soldier and room for back-face deformation of the armor plate as the armor plates absorb the projectile energy. The entire armor plate assembly is typically encased in a fabric, fiberglass, plastic or other type of protective material to prevent scuffing, minimize edge damage, and provide a uniform look to the final product. The effectiveness of a ceramic armor plate may depend at least partially on the absence of cracks, damage, or other abnormalities in the ceramic structure.

SUMMARY

According to one embodiment, an armor plate testing system includes an armor plate and a transducer attached to a first lateral face of the protective plate. The transducer is adapted to apply a mechanical signal to the protective plate at a first location.

According to another embodiment, a method of manufacturing an armor plate testing system includes applying an adhesive to a lateral face of a ceramic plate, placing a transducer on the adhesive, and curing the adhesive to attach the transducer to the ceramic plate. The method further includes applying a mechanical signal to the ceramic plate using the piezoelectric transducer, and receiving a reflected signal with a sensor.

According to a further embodiment, a method of testing an armor plate is disclosed. The armor plate has a strike face and first and second lateral faces. The method includes applying mechanical energy to the first lateral face with a transducer mounted to the first lateral face. The method further includes receiving, with the transducer, mechanical energy reflected by the second lateral face. And the method also includes sending signals representing the reflected mechanical energy from the transducer to a processor configured to analyze the signals to test for armor damage.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

In some cases, ballistic armor plates may be dropped, mishandled, or otherwise experience a variety of conditions which may alter the protective ability of the ballistic plate. For example, a ceramic plate may be dropped or hit which may cause the ceramic plate to experience a shock load. As another example, a ceramic plate may undergo significant temperature cycling, submersion, or other adverse conditions that alter the structure of the plate, especially in combination with wear and tear caused by impacts. Mitigating or minimizing the effect of adverse conditions on the plate may improve the longevity of the ceramic plate. In some cases, damage to the ceramic plate may hinder the ability of the plate to resist projectiles, and the damage may not be apparent from visual inspection. Accordingly, ceramic plate testing is generally conducted at regular intervals to determine the health of a given ceramic plate. These tests are traditionally performed with separate equipment from the ceramic plate such that the ceramic plate to be tested needs to be brought to the testing equipment or vice versa.

In view of the above, the inventors have recognized the benefits of an armor plate system which includes an on-board armor plate testing system. The armor plate testing system may be used to determine the health of an armor plate, such as a ceramic plate, without having to transport the plate to a different location, and without having to use a piece of equipment that is separate from the armor plate system in some embodiments. The armor plate damage testing system may include a transducer, such as a piezoelectric transducer, which is integrated into the body armor assembly, and may be used to apply mechanical energy to the ceramic plate. The transducer may apply ultrasonic signals in some embodiments. The piezoelectric transducer also may receive a reflected signal which may be used to determine the health of the ceramic plate. The waveform, frequency, and/or amplitude may vary from plate to plate over time, and depend on temperature, abuse, and damage conditions. Analysis of some or all of these parameters may be used to determine the health of the armor plate. The armor plate system may provide an indication of the ceramic plate health on demand to a wearer of the armor plate system.

The inventors have recognized that positioning a signal actuator on a lateral face of the armor plate instead of on the front or rear face of the armor may provide one or more advantages. As mentioned, in some embodiments, an armor plate testing system conducts a test by applying a mechanical signal to an armor plate. The signal may be a transverse wave or compression wave of mechanical energy depending on the position of the signal emitter. For example, a piezoelectric transducer mounted on the strike face of a ceramic armor plate may produce a transverse wave which radiates outwardly from the point of contact on the plate face. In contrast to a transducer on mounted the face of an armor plate, a transducer mounted on a lateral face of the plate may produce a compression wave. In some arrangements, a compression wave may produce a more reliable and stronger signal upon reflection. Thus, it may be desirable for the transducer to be mounted on a lateral face of the armor plate so that a transducer can produce and receive compression waves rather than transverse waves.

Additionally, positioning a sensor on a lateral face of an armor plate may better protect a sensor assembly as compared to a sensor assembly located on a face of the armor plate.

In some embodiments, an armor plate testing system may include a piezoelectric transducer, a controller, a power source, and an indicator. The transducer may be an ultrasonic transducer and may be attached to the ceramic plate using an adhesive so that the transducer and the ceramic plate form an integrated unit. The controller, power source, and/or indicator may be connected to the transducer and may be arranged to test and indicate the health of the ceramic plate using the transducer and the indicator, respectively. The transducer and/or other components of the testing system may be covered by a housing that protects the components from shock, temperature variation, and/or submersion.

In some embodiments, an armor plate testing system includes an indicator adapted to provide an indication as to the health of the ceramic plate. The indicator may be any suitable device that is able to convey information to a user of the armor plate system. For example, the indicator may be a visual indicator such as an LED, a display screen, or any other visual device. As another example, the indicator may be an auditory indicator such as speaker which may emit a tone or other audible sound to indicate the armor plate system health to a user. Of course, any suitable indicator may be used in to convey information to a user regarding the health of the armor plate system, as the present disclosure is not so limited.

In some embodiments, an armor plate testing system may be covered to protect the armor plate damage sensor during normal use of an armor plate system. In many cases, armor plates are subjected to a significant amount of wear and tear during normal use including temperature variations, submersion, and shock loads from handling. Accordingly, an armor plate testing system may be as robust as the ceramic plate on which it may be mounted. In some embodiments, the armor plate sensor may be disposed inside housing mounted on the ceramic plate. The housing may be made of plastic, metal, or any suitable material that protects the armored plate damage sensor. In other embodiments, the armor plate testing system may be disposed inside a protective lateral face covering. The protective lateral face covering may be permanently or removably attached to one or more lateral faces of the armor plate. For example, the protective lateral face covering may include a U-shaped channel adapted to receive a lateral face and adjacent edges of the plate and an armor plate testing system disposed thereon.

In some embodiments, the armor plate testing system, or portions thereof, may be disposed inside of an encapsulant which covers both the testing system and the ceramic plate. For example, the encapsulant may be sprayed over the armor plate testing system as well as the ceramic plate during a manufacturing process. Of course, any combination of coverings or protective materials may be employed to protect the armor plate testing system from normal wear and tear, as the present disclosure is not so limited. Additionally, different components of the armor plate testing system may be disposed in different protective coverings. For example, a transducer may be disposed inside of encapsulant while a controller, power source, and indicator may be disposed inside of a removable housing.

In some embodiments, a method of manufacturing an armor plate system includes applying adhesive to a lateral face of a ceramic plate, placing a transducer in the adhesive, and curing the adhesive to attach the transducer to the ceramic plate. The adhesive may securely attach the transducer directly to the ceramic, and may be sufficiently rigid to allow for reliable transmission of a signal produced by the transducer.

The method of manufacturing the armor plate system may also include an initial system test including transmitting a signal to the ceramic plate using a transducer and receiving a reflected signal using the transducer. The transmission and reception of the signal and reflected signal may confirm successful attachment of the transducer to the ceramic plate, and may also be used to determine a baseline reflected signal against which future tests may be compared.

In some embodiments, a method of manufacturing an armor plate system includes attaching circuitry to a transducer. The transducer may be permanently mounted to a ceramic plate using adhesive, and may further be secured plate with an encapsulant which covers both the transducer and the ceramic plate. In some cases, it may be desirable for a power source other controlling electrical components to be easily replaceable, as such components may wear out more quickly than the ceramic plate. Accordingly, the transducer may be permanently attached to the ceramic plate wall, and other electrical components may be removably attached to the ceramic plate. For example, electrical contacts from the transducer may be accessible to connect other components of the armor plate testing system. For example, the transducer may be connected to a controller which may be disposed outside of the encapsulant. A power source as well as indicator may also be connected to the controller during the manufacturing process. The controller, power source, and indicator may be mounted inside of a housing which is attachable to the ceramic plate. The armor please damage sensor including a controller, power source, and indicator may be permanently attached to the ceramic plate along with the transducer, as the present disclosure is not limited.

In some embodiments, a method of manufacturing armor plate system includes providing ceramic plates manufactured using any conventional method. The ceramic plates may have rough lateral faces formed by a conventional manufacturing process. Accordingly, it may be desirable to clean one or more lateral faces of the ceramic plate to promote good contact with the transducer. In some embodiments, at least one of the lateral faces of the ceramic plate is smoothed or otherwise cleaned in preparation for applying adhesive to the lateral face.

Figure 1:
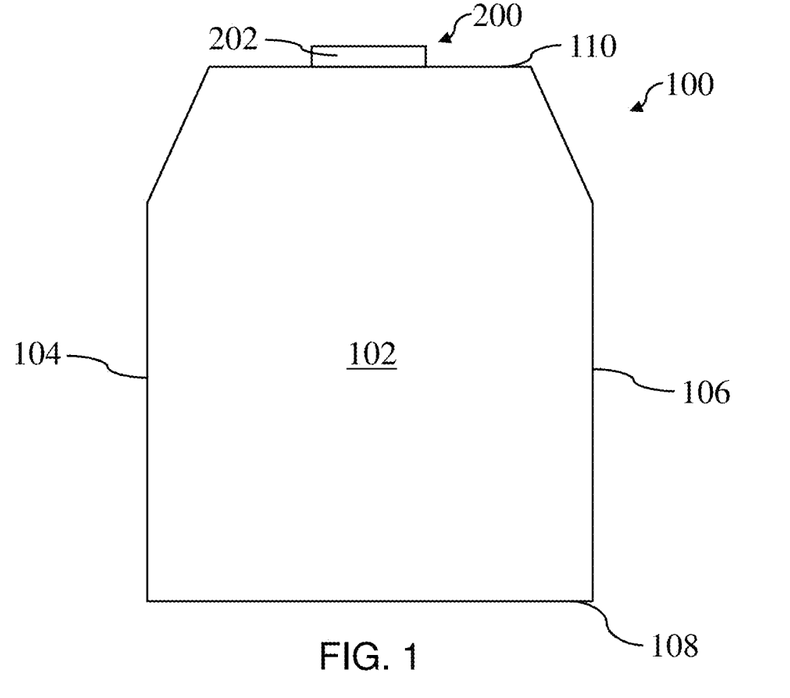
FIG. 1 is a schematic of one embodiment of an armor plate system.

FIG. 1 is a schematic of one embodiment of an armor plate system 100. The armor plate system 100 includes a ceramic plate 102 and an armor plate testing system 200. The ceramic plate includes a front, strike face, and a rear face. Lateral faces, including a left lateral face 104, a right lateral face 106, a bottom lateral face 108, and a top lateral face 110, extend from the front face to the back face. As shown in FIG. 1, the left lateral face and the right lateral face taper toward the top lateral face. In other embodiments, the left lateral face and the right lateral face may be substantially linear without a taper, or any other suitable shape. As shown in FIG. 1, the armor plate testing system is positioned on the top lateral face 110. The armor plate testing system includes a transducer, such as a transducer 202, which is attached directly to the ceramic plate 102 on the top lateral face 110. For purposes herein, a first lateral face and a second lateral face can be the same lateral face at two different locations.

Figure 2:
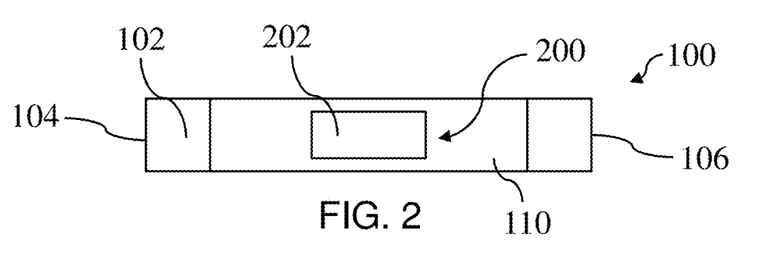
FIG. 2 is a top schematic of the armor plate system of FIG. 1.

FIG. 2 is a schematic of a top of the armor plate system 100 of FIG. 1. As shown in FIG. 2, the transducer 202 of the armor plate testing system 200 is positioned on the top lateral face 110 of the ceramic plate 102. Accordingly, the armor plate testing system may be easily accessible when the plate is worn. For example, the armor plate testing system may be visible to a user of the armor plate system when the armor plate system is worn in a plate carrier. As shown in FIG. 2, the transducer 202 may be arranged to apply signals from the top lateral face 110 of the ceramic plate toward the bottom lateral face of the plate. That is, the transducer 202 apply inject a compression wave of energy which travels into the plate (i.e., into the page). Compression wave may be reflected off of lateral faces (e.g., the bottom lateral face and/or side lateral faces) and travel back toward the transducer 202 mounted on the top lateral face 110. As should be evident from the above description, a lateral face can refer to an externally-facing lateral face of an armor plate and/or an internal lateral face which reflects mechanical signals within the armor plate. An internal lateral face is the end of the armor plate.

Figure 3:
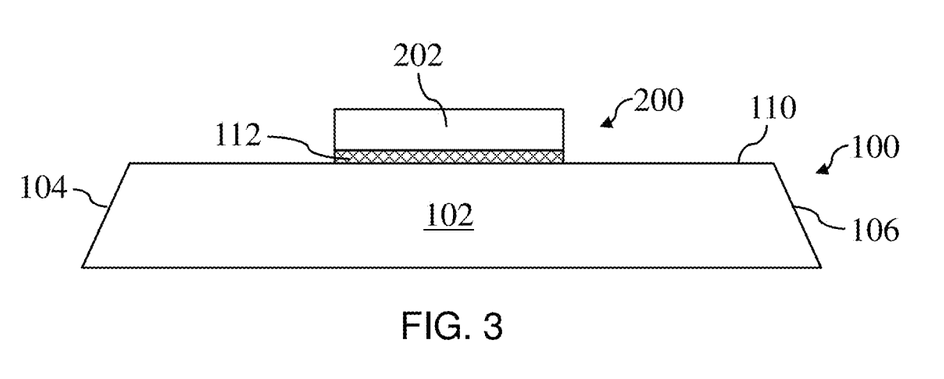
FIG. 3 is an enlarged view of the armor plate system of FIG. 1.

FIG. 3 is an enlarged view of the armor plate system of FIG. 1. As shown in FIG. 3, the transducer 202 may be mounted to the top lateral face 110 of the ceramic plate 102 using an adhesive 112. The adhesive 112 may be any suitable adhesive which provides a secure mounting solution for the transducer 202 and which readily transmits energy from the transducer to the ceramic plate and vice versa. For example, the adhesive may be a cyanoacrylate, epoxy, peel-and-stick adhesive tape, chemical, contact, or pressure activated adhesive, or any other suitable adhesive which may be used to secure the transducer to the ceramic plate. The adhesive selection may determine the strength of the signal transmitted from the transducer to the ceramic plate 102 and the strength of the reflected signal transmitted from the ceramic plate to the transducer 202 as the adhesive may absorb some energy due to its elasticity. Accordingly, the adhesive used to mount the transducer may affect the reliability and accuracy of an armor plate testing system. In some embodiments the adhesive used may be a cyanoacrylate which may have suitable rigidity and strength for effectively transmitting signals between the transducer and the ceramic plate.

An adhesive for mounting a transducer to a ceramic plate may be selected to promote good signal transmission while maintaining enough flexibility to resist thermal fluctuations, submersion, and shock loading that an armor plate may experience during use. For example, hard adhesives may conduct more of the signal as possible without absorbing a significant portion of the energy. As another example, an adhesive may shear off if the transducer and ceramic plate have different thermal expansion rates and the adhesive is inflexible. Accordingly, an adhesive may be carefully selected for particular environmental conditions that the armor plate system is expected to encounter. In some embodiments, a blended or hybrid adhesive such as a blend of cyanoacrylate and rubber provides suitable energy transmission and flexibility to resist shearing. In some embodiments, a fiber-reinforced epoxy may be used. Any suitable adhesive may be employed, as the present disclosure is not so limited.

The shape of the illustrated armor plate is only one embodiment. The systems disclosed herein may be used with any suitably shaped armor plate. For example, square side plates may be used which protect the rib cage under the arms are smaller and more square. Curved belly plates which hang below a main chest plate may be used. Shooter plates include notches on right or left side to improve range of motion of one arm when holding a weapon.

The location of the transducer(s) can vary in different embodiments. A curved or flexible sensor and circuit board allows adaptation to various lateral face shapes. Some armor systems use a pouch to hold the armor plate, and the pouch opens downwardly toward the waist. A plate for this system may be manufactured with the indicator and/or transducer on the bottom lateral face 108 so that the indicator may be seen by opening the pouch and without removing the plate. The indicator may be separate from the transducer(s), and may be placed on the front or rear face in some embodiments, when the transducer is located on a lateral face.

Figure 4:
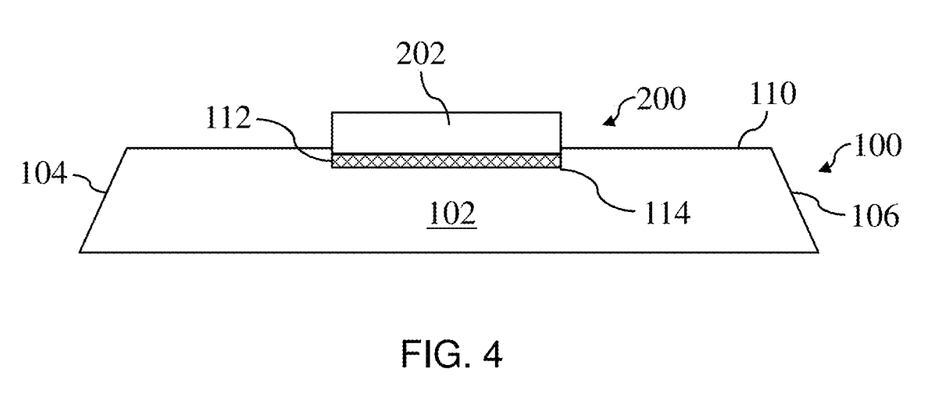
FIG. 4 is an enlarged view of another embodiment of an armor plate system.

FIG. 4 is an enlarged view of another embodiment of an armor plate system. In the embodiment of FIG. 4, the ceramic plate 102 may include a recess 114 which receives the adhesive 112 and the transducer 202. The recess may allow the transducer to better resist lateral forces which may otherwise displace or damage the transducer and/or adhesive. Of course, the adhesive and transducer may be attached to any suitable surface of the ceramic plate so that the transducer may be able to transmit a signal to the ceramic plate.

Figure 5:
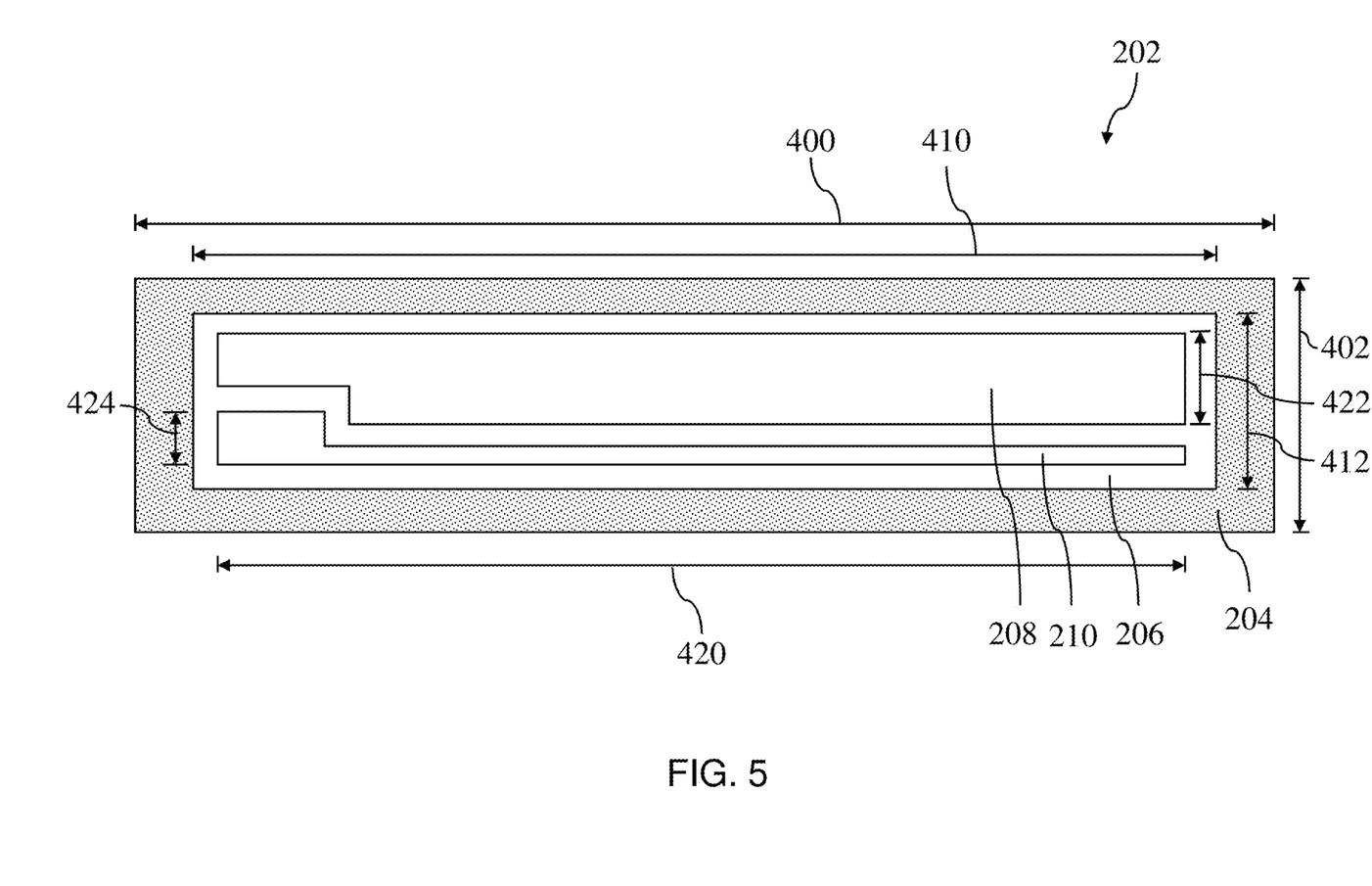
FIG. 5 is a schematic view of one embodiment of a transducer.

FIG. 5 is a schematic of one embodiment of a transducer 202. The transducer includes a substrate 204, a piezoelectric material 206, a driver electrode 208 and a feedback electrode 210. The substrate 204 may be any suitable substrate for electronic elements, and may be arranged as a PCB. The piezoelectric material 206 is formed as a single piece which extends along the length of the substrate 204. On the substrate, the electrodes 208 and 210 are positioned to generate and receive signals. That is, an electrical signal applied to the driver electrode 208 causes the piezoelectric material to bend and transmit mechanical energy to an attached ceramic plate. The feedback electrode converts the reflected mechanical energy into an electrical signal which may be analyzed, for example by a processor programmed to perform analysis. As shown in FIG. 5, the transducer is rectangular which may be well suited for attachment to a lateral face of a ceramic plate. The transducer may employ any suitable shape, including circular, elliptical, or square. In some embodiments, the driver electrode 208 and the feedback electrode may be disposed on separate piezoelectric elements, which may isolate the driven signal from being picked up directly by the feedback electrode.

In some embodiments, a bi-directional circuit may be employed which is capable of both driving the transducer and receiving electrical signals from the transducer using a single electrode. In such an embodiment, electrodes 208 and 210 may be combined into a single electrode.

In some embodiments, a transducer may be sized and configured to correspond to the size of a lateral face of a ceramic plate. For example, the width of a transducer may be sized approximately equal to thickness of the ceramic plate. As shown in FIG. 5, the driver electrode 208 and the feedback electrode 210 may be arranged adjacent to one another so that each electrode has a similar tuned response. The electrodes 208, 210 may occupy a significant portion of the length of the transducer. In some embodiments, the piezoelectric material 206 is arranged to provide a high level of capacitance that may increase the sensitivity of the transducer to returning waves. The thickness of the piezoelectric material 206 may be selected to produce a suitably high capacitance for signal generation and reception.

As shown in FIG. 5, the transducer may be suitably sized to apply a mechanical signal to a lateral face of an armor plate. In some embodiments, a length of a substrate 400 may be between 10 mm and 60 mm. In some embodiments, the substrate may be approximately equal to 15 mm, 20 mm, 25 mm, 30 mm, 35 mm, 40 mm, 50 millimeters, or any other suitable length. In some embodiments, the width of a substrate 400 may be between 1 mm and 6 mm. For example, the substrate width may be approximately equal to 1 mm, 2 mm, 3 mm, 4 mm, 5 mm, 6 mm, or any other suitable width. Combinations of the above noted dimensions are contemplated, including, but not limited to, substrates with surface areas between or equal to 15 mm$^2$ and 200 mm$^2$, 50 mm$^2$ and 250 mm$^2$, as well as 75 mm$^2$ and 300 mm$^2$. Of course, different combinations of the above described dimensions are also contemplated as well surface areas greater than less than those noted above, as the present disclosure is not so limited.

As shown in FIG. 5, an active element may be sized to fit on a substrate 204. In some embodiments, the active element 206 may have a length 410 between 10 mm and 40 mm. For example, the active element may be approximately equal to 10 mm, 20 mm, 30 mm, 40 mm, or any other appropriate length. Combinations of the above noted lengths 410 are contemplated, including, but not limited to, lengths between or equal to 10 mm and 20 mm, 20 mm and 40 mm, as well as 10 mm and 40 mm. The active element 206 may have a width 412 approximately equal to 0.5 mm, 1 mm, 2 mm, 3 mm, 4 mm, 5 mm, 6 mm, or any other appropriate width. Combinations of the above noted widths 412 are contemplated, including, but not limited to, widths between or equal to 0.5 mm and 2 mm, 1 mm and 3 mm, 0.5 mm and 4 mm, as well as 1 mm and 6 mm. Of course, different combinations of the above described dimensions are also contemplated as well as widths and lengths greater than and less than those noted above, as the present disclosure is not limited.

As shown in FIG. 5, electrodes 208, 210 may be sized to fit within the active element 206. In some embodiments, an electrode may have a length 420 of between 5 mm and 35 mm. For example, the electrode may have a length approximately equal to 5 mm, 10 mm, 20 mm, 25 mm, 30 mm, 35 mm, or any other appropriate length. Combinations of the above noted lengths 420 are contemplated, including, but not limited to, lengths between or equal to 5 mm and 20 mm, 10 mm and 25 mm, 10 mm and 30 mm, as well as 5 mm and 35 mm. The driver electrode 208 may have a maximum width 422 approximately equal to 0.25 mm, 0.75 mm, 1.5 mm, 2 mm, 2.5 mm, 3 mm, 4 mm, or any other appropriate width. Combinations of the above noted maximum widths 422 are contemplated, including, but not limited to, widths between 0.25 mm and 2 mm, 0.75 mm and 2.5 mm, 1.5 mm and 4 mm, as well as 0.25 mm and 4 mm. The feedback electrode 210 may have a maximum width 424 approximately equal to 0.15 mm, 0.25 mm, 0.75 mm, 1 mm, 1.5 mm, 2 mm, 3 mm, or any other suitable width. Combinations of the above noted maximum widths 424 are contemplated, including, but not limited to, widths between 0.15 mm and 0.75 mm, 0.25 mm and 1.5 mm, 0.75 mm and 1.5 mm, 0.75 mm and 3 mm, as well as 0.15 mm and 3 mm. Of course, the electrodes 208, 210 may be sized at any appropriate dimensions to fit within the active element 206 and transmit a signal, such as an ultrasonic signal, to the ceramic plate, as the present disclosure is not so limited.

Figure 6:
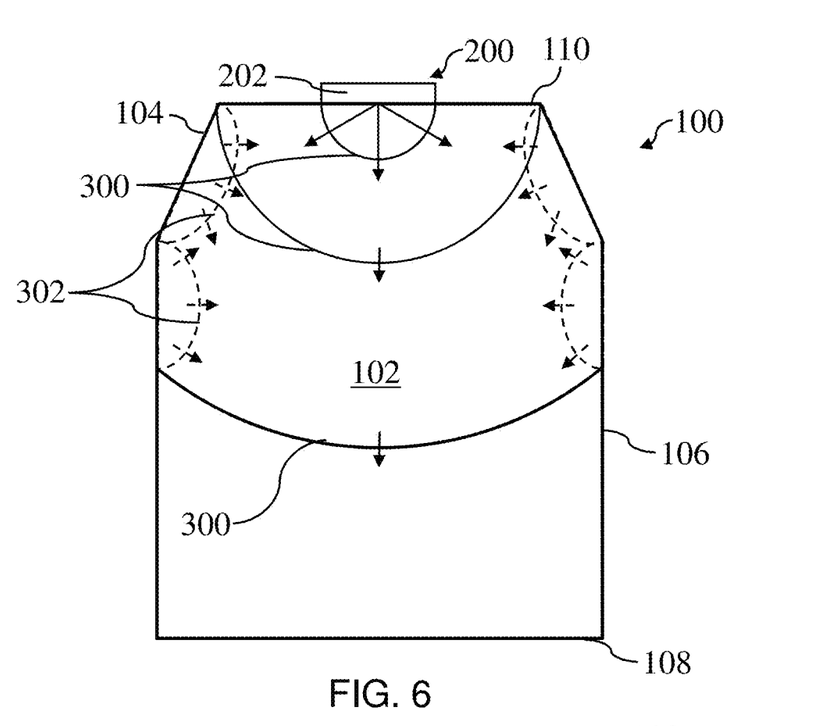
FIG. 6 shows one embodiment of a transducer applying a signal.

FIG. 6 shows one embodiment of a transducer 202 applying mechanical energy to the plate in the form of a compression wave. As shown in FIG. 6, the armor test sensor 200 including the transducer 202 is mounted on a top lateral face 110 of the ceramic plate 102. The transducer 202 is securely mounted to the ceramic plate 102 so that the transducer can generate and pass the mechanical energy to the ceramic plate. As shown in FIG. 6, the signal is being transmitted through the ceramic plate 102.

The signal is formed as a compression wave 300 which radiates outwardly and away from the transducer in all directions. As shown in FIG. 6, the compression wave radiates primarily from the top lateral face 110 and strikes other lateral faces as it spreads out. The compression wave 300 reflects off of the lateral faces of the ceramic plate, as well as any structural irregularities inside of the armor plate. As shown in FIG. 6, reflected compression waves 302 are generated once a compression wave 300 impacts the faces of the plate or other structural irregularity and reflects.

The transducer 202 may be arranged to receive the reflected compression waves 302 to determine the health of the ceramic plate 102. As the transducer 202 is mounted on the top lateral face 110, the signals sent and received by the transducer are primarily compression waves which propagate in the plane defined by the ceramic plate. This is in contrast to a transducer mounted on a face of the ceramic plate 102 where signals may radiate outwards orthogonal to the transducer (i.e., transverse waves). Compression waves may be higher amplitude and or have a higher fidelity relative to transverse waves so that a transducer may reliably generate and receive a signal propagating through the ceramic plate 102. Of course, a transducer may receive any combination of signals including both compression waves and transverse waves in order to determine the health of a ceramic plate, as the present disclosure is not so limited. The waves received may have a wide range of frequency content which is affected by the size, shape, and composition of the plate. These frequencies may include both sonic and ultrasonic components.

Figure 7:
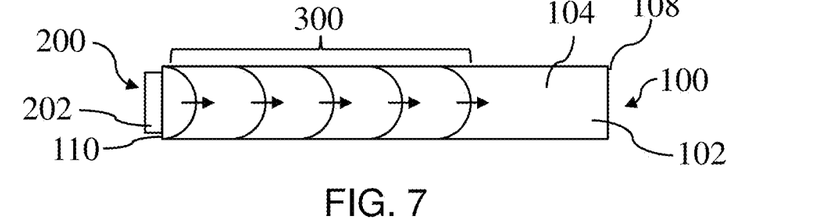
FIG. 7 shows one embodiment of a compression wave.

FIG. 7 shows one embodiment of a compression wave 300 propagating through a ceramic plate 102. A transducer 202 of armor plate testing system 200 is mounted on a top lateral face ceramic plate 110. The transducer produces a signal which passes into the plate and propagates in the direction of a bottom lateral face 108 of the ceramic plate. That is, the signal is passed as a compression wave 300 which propagates in the plane defined by the ceramic plate 102. It should be noted that a compression wave may not always propagate toward the bottom lateral face 108, but rather propagates in the plane of the ceramic plate away from the transducer 202. A ceramic plate 102 may readily transmit compression waves from a transducer.

Figure 8:
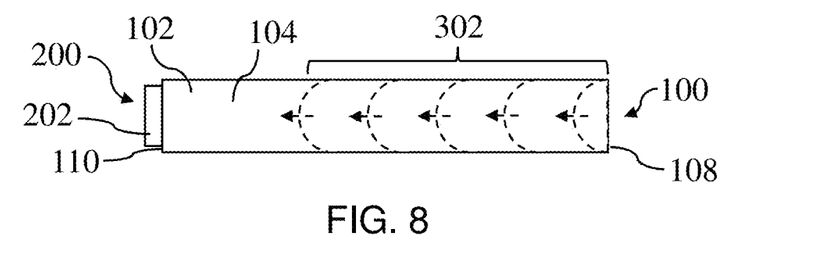
FIG. 8 shows one embodiment of a reflected compression wave.

FIG. 8 shows one embodiment of reflected compression waves 302 propagating through ceramic plate 102. As shown in FIG. 8, transducer 202 of the armor plate testing system 200 has stopped generating a signal, but energy continues to propagate throughout the ceramic plate 102. In the embodiment shown in FIG. 8, the compression waves 300 shown in FIG. 7 have reflected off of the bottom lateral face 108 and are returning in the plane of the ceramic plate 102 toward the transducer 202 in the form of reflected compression waves 302. The transducer 202 may be arranged to receive these reflected waves and generate an electrical signal which may be analyzed to determine the health of the ceramic plate. Waves may reflect off of various lateral faces and irregularities of the ceramic plate and may not solely reflect off of a single lateral face. Accordingly, the transducer 202 may receive reflected compression waves from a variety of different surfaces which may be used to determine if any cracks or structural irregularities are formed in the ceramic plate 102.

Figures 9, 10:
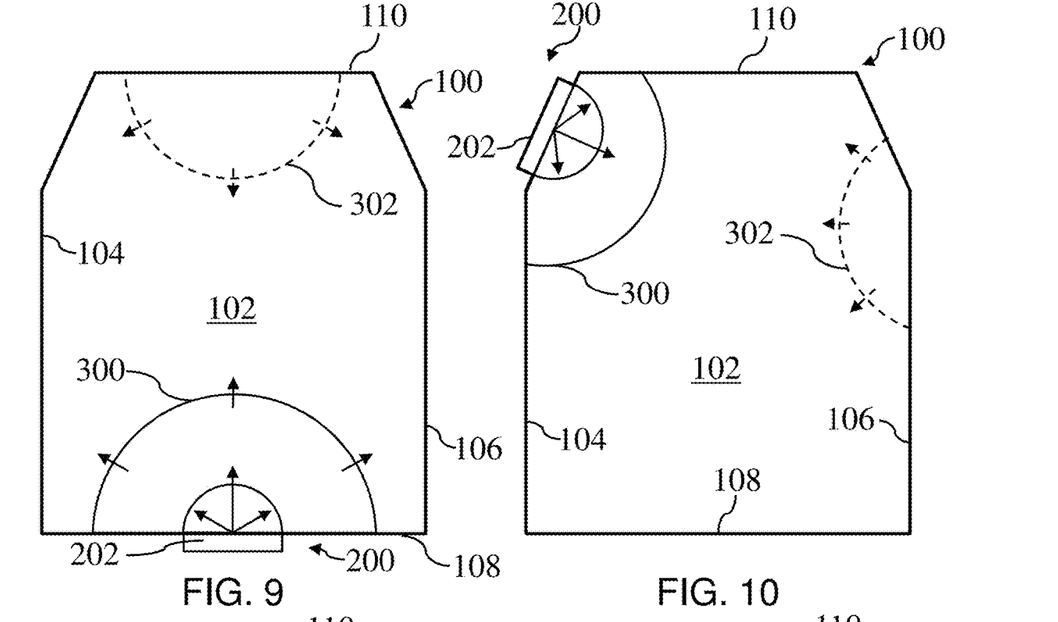
FIG. 9 shows another embodiment of an armor plate system including a transducer applying a signal.
FIG. 10 shows yet another embodiment of an armor plate system including a transducer applying a signal.

FIG. 9 shows another embodiment of an armor plate system 100 including a transducer 202 of an armor plate testing system 200 applying a signal. As shown in FIG. 9, the armor plate testing system is mounted on a bottom lateral face 108 the armor plate. The transducer 202 generates a signal which passes into a ceramic plate 102 and propagates as a compression wave 300 which radiates outward from the transducer toward the other lateral faces of the ceramic plate. As shown in FIG. 9, the compression wave 300 will reflect off of the various other lateral faces (e.g., reflection off of the top lateral face 110 is shown in FIG. 9) as well as any structural irregularities, and will form a reflected compression wave 302 which propagates back toward the transducer 202. The reflected compression wave 302 and be received by the transducer 202, whereupon the transducer may generate an electrical signal indicative of the health of the ceramic plate 102.

FIG. 10 shows yet another embodiment of an armor plate system 100 including a transducer 202 of an armor plate testing system 200 applying a signal. As shown in FIG. 10, transducer 202 is mounted on a left lateral face 104 of the ceramic plate 102. In particular, the transducer 202 is mounted on a tapered portion of the left lateral face 104 near the top lateral face 110. The transducer 202 is arranged to generate a signal which is passed into the ceramic plate 102 and propagates throughout the ceramic plate as a compression wave 300. As discussed previously, the compression wave 300 may reflect off of the various lateral faces (e.g., reflected compression wave 302 is shown off of a right lateral face 106) and/or structural irregularities and propagate back toward the transducer. The transducer 202 may receive any reflected compression wave 302 and generate an electric signal indicative of the health of the ceramic plate.

Figure 11:
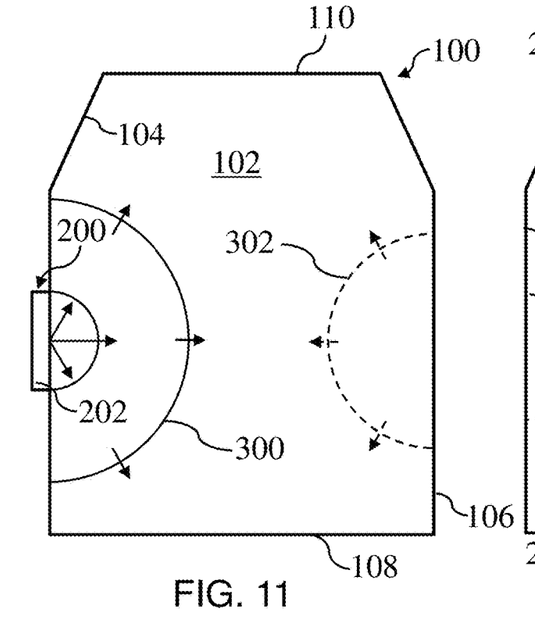
FIG. 11 shows another embodiment of an armor plate system including a transducer applying a signal.

FIG. 11 shows still yet another embodiment of an armor plate system including a transducer applying a signal. As shown in FIG. 11, transducer 202 is mounted on a left lateral face 104 of the ceramic plate 102. In particular, the transducer 202 is mounted on straight, non-tapered portion of the left lateral face 104 near the top lateral face 110. The transducer 202 is arranged to generate a signal which is passed into the ceramic plate 102 and propagates throughout the ceramic plate as a compression wave 300. As discussed previously, the compression wave 300 may reflect off of the various lateral faces (e.g., reflected compression wave 302 is shown off of a right lateral face 106) and/or structural irregularities and propagate back toward the transducer. The transducer 202 may receive any reflected compression wave 302 and generate an electric signal indicative of the health of the ceramic plate.

The mounting position of a transducer on a ceramic plate may determine the types and amplitudes of reflected waves. For example, a transducer mounted on a top lateral face of a ceramic plate may receive the strongest signals from reflected waves on the bottom lateral face of the ceramic plate. Accordingly, it may be desirable to place the transducer in a location that receives the strongest reflected waves through the largest area of the plate possible. That is, in a case where a ceramic plate is rectangular, it may be desirable for the transducer to be positioned on one of the short sides of the rectangle, so that compression waves may propagate and be reflected directly back to the transducer through a larger area of the plate. Each reflection of the compression wave may reduce the amplitude of the signal. Accordingly, a transducer may be placed in any suitable location to minimize the number of reflections in a healthy armor plate. Such an arrangement may allow better detection of a structural irregularity such as a crack which may cause a large increase in the number of reflections and a corresponding decrease in the signal amplitude received by the transducer. Of course, a transducer may be positioned in any suitable location where energy can be transmitted to and received from a ceramic plate, as the present disclosure is not so limited.

Figure 12:
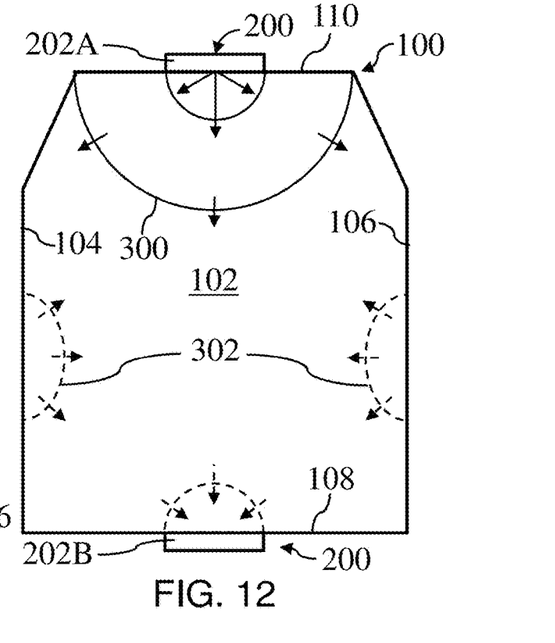
FIG. 12 shows another embodiment of an armor plate system including a transducer applying a signal and a second transducer receiving the signal.

FIG. 12 shows still yet another embodiment of an armor plate system 100 including a transducer 202A applying a signal and a second transducer 202B receiving the signal. The first transducer 202A is mounted in a top lateral face 110 of the ceramic plate 102. The second transducer 202B is mounted on a bottom lateral face 108 of the ceramic plate 102. The first transducer 202A is arranged to generate a signal and transmit that signal to ceramic plate which propagates through the ceramic plate in the form of a compression wave 300. The compression wave 300 reflects off of the various lateral faces and over structural irregularities in the ceramic plate 102 in the form of a reflected compression wave 302. The second transducer 202B is arranged to receive the reflected compression waves 302 and/or the compression wave 300 in order to generate electronic signal indicative of the health of the ceramic plate.

Figure 13:
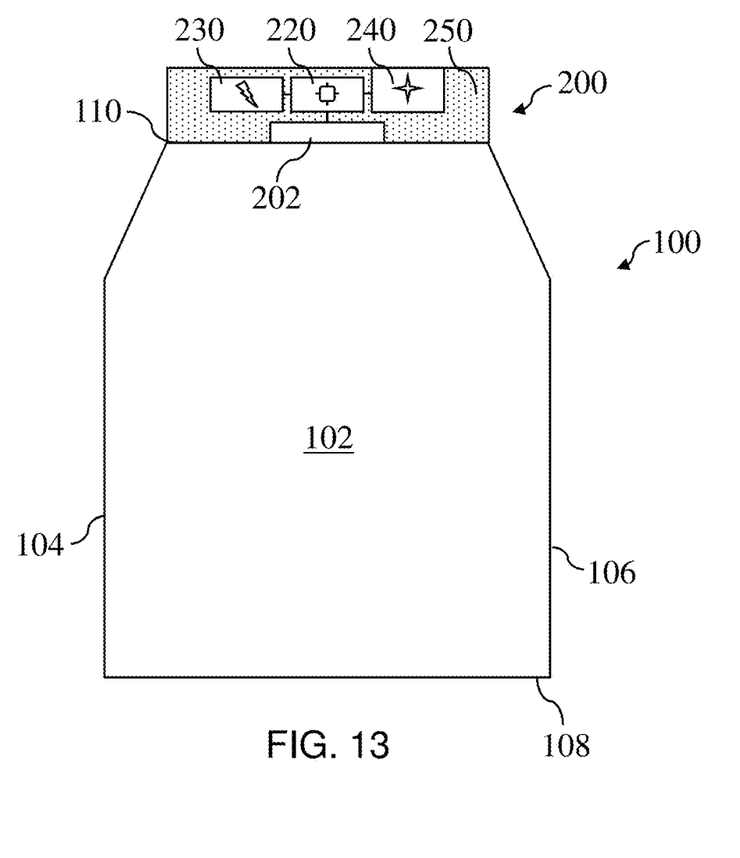
FIG. 13 is a schematic of another embodiment of an armor plate system.

FIG. 13 is a schematic of another embodiment of an armor plate system 100 including an armor plate testing system 200. The armor plate testing system includes a transducer 202, a controller 220, a power source 230, and an indicator 240. The armor plate testing system is mounted inside of a housing 250 which is attached to a top lateral face 110 of the ceramic plate 102. As shown in FIG. 13, the various components of the armor plate testing system 200 are electrically connected together and controlled by the controller 220. The controller 220 is arranged to supply power to the transducer 202 from the power source 230 to generate a signal which propagates through the ceramic plate 102. The controller is also arranged to receive electrical signals generated by the transducer when the transducer receives reflected signals. The power source 230 may include a battery or other mobile power source such as a solar panel. The power source 230 may be replaceable without removal of the armor plate testing system from the ceramic plate 102 in some embodiments. In some embodiments, a rechargeable battery may be used, and the battery may be permanently mounted to the armor system, but provide access for an electrical connector for recharging. In some embodiments, recharging may be achieved wirelessly, or via an energy harvesting means such as radio frequency, magnetic, electric field, kinetic energy, or solar energy.

As shown in FIG. 13, the indicator 240 is arranged as a visual indicator which is visible from outside of the housing 250. The indicator 240 may be arranged as any suitable visual indicator including, but not limited to, LEDs or digital displays. For example, the visual indicator 240 may be arranged as a series of three LEDs: one red, one orange, and one green. According to this embodiment, upon completion of a test, one of the three LEDs will illuminate according to the result of the test. The red LED may correspond to a broken or otherwise damaged plate, the orange LED may correspond to a partially damaged plate, while the green LED may correspond to a healthy plate. Of course, any suitable indicators may be employed, including auditory indicators, as the present disclosure is not so limited.

The on-board indicator may display a certain amount of information, while a wirelessly connected indicator may provide different or additional information. For example, the indicator 240 may include two LEDs to indicate a healthy plate or a damaged plate. A separate indicator, such as a display screen on a mobile device, a computer, or other device that is wirelessly connected (or temporarily connected via a cable) to the armor plate system, may receive and indicate information regarding battery life, damage history, manufacturing data, serial number, and/or other information. A separate indicator may receive information by any suitable arrangement, such as by infrared light or other methods.

As shown in FIG. 13, the housing 250 is mounted to a top lateral face 110 of the ceramic plate 102. The housing 250 may be made of any suitable material including metal or plastic and may fully enclose the armor plate testing system. The housing may be attached to the armor plate using any suitable arrangement, including, but not limited to, adhesives, interference fits, or fasteners. For example, the housing 250 may include a U-channel which fits over a lateral face of the ceramic plate 102 and securely holds the armor plate testing system to the ceramic plate. According to this example, the housing 250 may be removable from the ceramic plate 102. In some embodiments, the housing and the controller 220, the power source 230, and the indicator 240 may be removable from the ceramic plate 102 while the transducer 202 is permanently affixed to the ceramic plate. According to this embodiment, the transducer 202 and the controller 220 may each include an electrical connector used to connect the transducer to the rest of the armor plate testing system. Such an arrangement may be appropriate in cases where different indicators, controllers, or power sources are desired.

Figure 14:
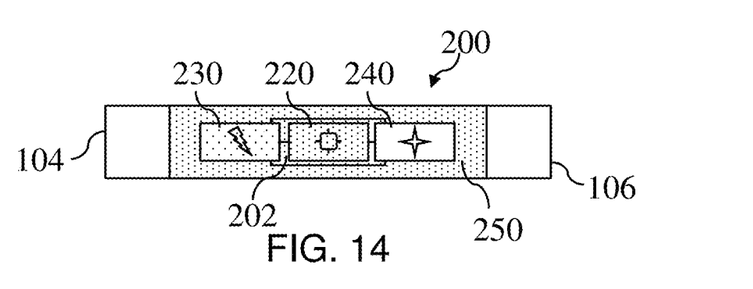
FIG. 14 is a schematic of a top of the armor plate system of FIG. 13.

FIG. 14 is a top schematic of the armor plate system 100 of FIG. 13. As shown in FIG. 14, the armor plate testing system 200 includes transducer 202, a controller 220, a power source 230, and an indicator 240. As discussed previously, the indicator 240 is visible from outside of the housing 250. The controller 220, power source 230, and transducer 202 may be fully enclosed by the housing 250. The housing 250 may provide protection to the armor plate testing system from temperature fluctuations, submersion, and shock loading. Indicator 240 may be arranged to independently resist temperature fluctuations, submersion, and shock loading, and may form a seal the housing so that the controller, power source, and transducer are fully protected.

Figure 15:
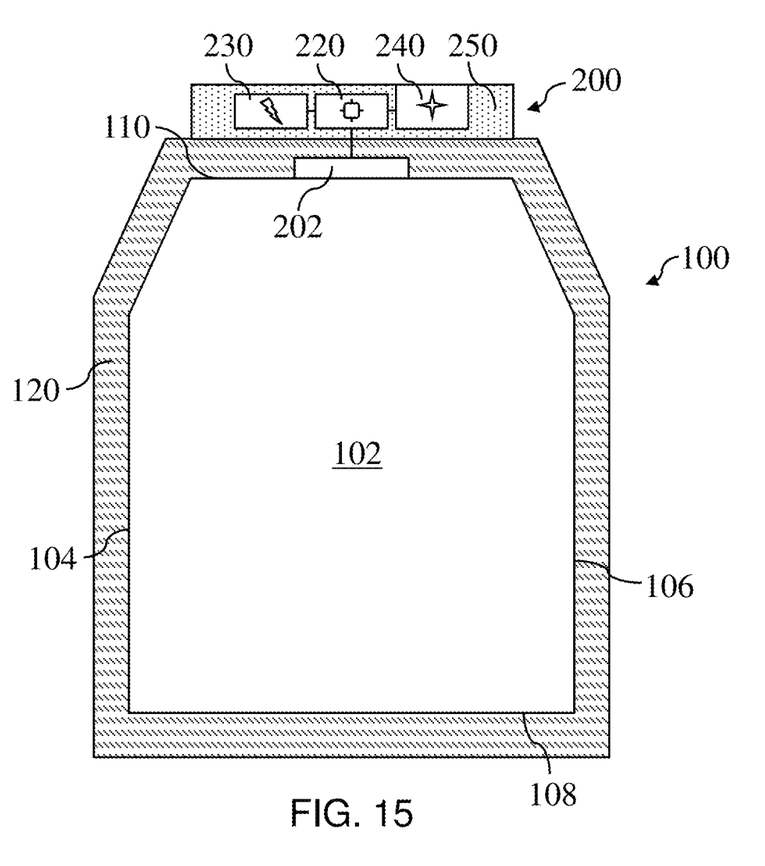
FIG. 15 is a schematic of yet another embodiment of an armor plate system.

FIG. 15 is a schematic of another embodiment of an armor plate system 100. As shown in FIG. 15, the armor plate system 100 includes an armor plate testing system 200. The armor plate testing system 200 includes transducer 202, the controller 220, a power source 230, and indicator 240, and a housing 250. The controller, power source, and indicator are disposed within the housing, while the transducer is mounted directly to the ceramic plate 102 underneath a protective material 120. The protective material 120 may be an encapsulant or a protective lateral face guard. In a case where the protective material 120 is an encapsulant, the encapsulant may fully cover both the ceramic plate and the transducer 202. In a case where the protective material 120 is a protective lateral face guard, the protective lateral face guard may be disposed around the lateral faces of the ceramic plate leaving the most of the strike face of the ceramic plate uncovered. The protective material 120 may cover the transducer 202 to protect the transducer from general wear and tear including temperature fluctuations, submersion, and shock loading.

As shown in FIG. 15, the housing 250 is mounted to the protective material 120. The housing 250 mounts and protects the controller 220, power source 230, and indicator 240. In some embodiments, the housing 250 may be removable from the protective material 120 so that the controller, power source, and/or indicator may be conveniently replaced. According to the embodiment shown in FIG. 15, an electrical connector may project out of the housing 250 to be connected to an electrical connector from the transducer 202, which may project out of the protective material 120. Thus, the housing including any number of armor damage sensor components may be quickly and easily connected to the transducer 202 in some embodiments.

Figure 16:
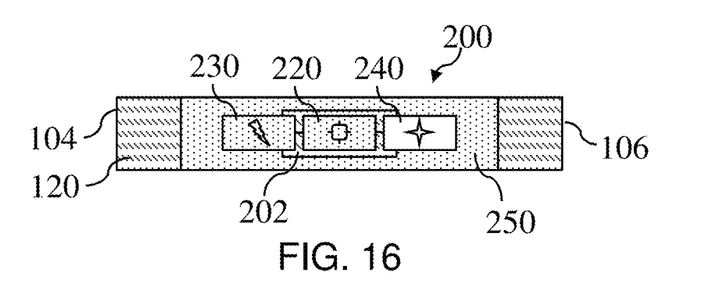
FIG. 16 is a schematic of a top of the armor plate system of FIG. 15.

FIG. 16 is a top schematic of the armor plate system 100 of FIG. 15. As shown in FIG. 16, and discussed above, the armor plate testing system includes transducer 202, controller 220, power source 230, indicator 240, and housing 250. The indicator 240 is arranged as a visual indicator and is visible from outside of the housing 250. The transducer 202 is disposed underneath both the protective material 120 as well as the housing 250 which may provide additional protection for the transducer.

Figure 17:
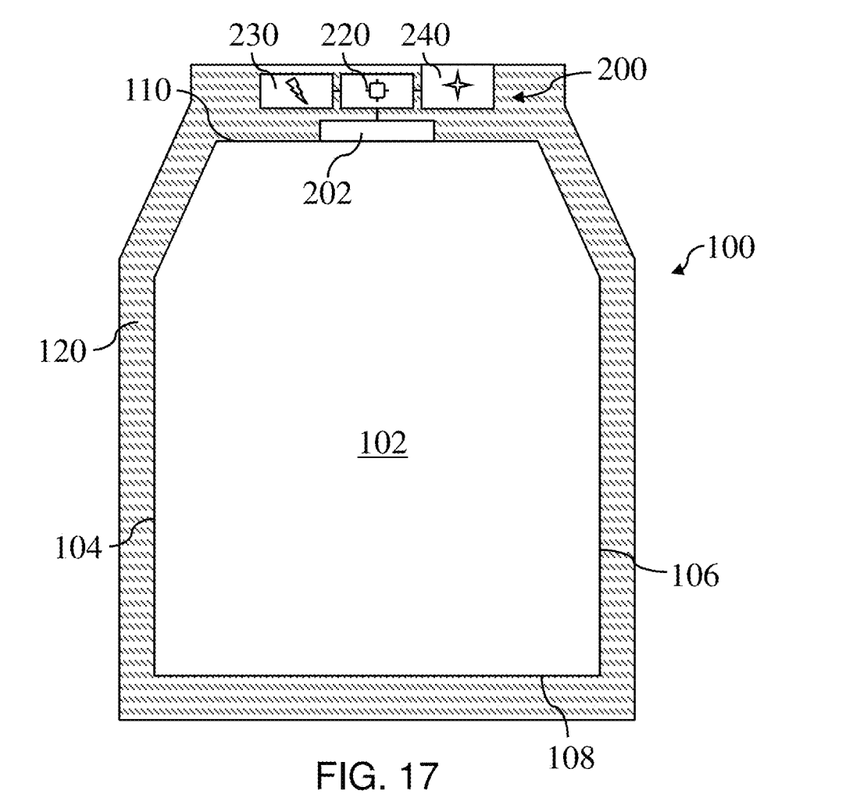
FIG. 17 is a schematic of yet another embodiment of an armor plate system.

FIG. 17 is a schematic of another embodiment of an armor plate system 100 including an armor plate testing system 200. Similar to embodiments disclosed above, the armor plate testing system includes transducer 202, controller 220, power source 230, and indicator 240. As shown in FIG. 17, the armor plate testing system disposed under a protective material 120 which surrounds the ceramic plate 102. As discussed previously, the protective material may be an encapsulant or a protective lateral face guard. In the case where the protective material is an encapsulant, the encapsulant may be sprayed on over the armor plate testing system in the ceramic plate to fully integrate the armor plate testing system with the ceramic plate. In this case, the armor plate testing system may be permanently attached to the ceramic plate, as removal of the protective encapsulant may be difficult or damaged the ceramic plate and/or armor plate testing system. In a case where the protective material 120 is a protective lateral face guard, the lateral face guard may be removable so that one or more components of the armor plate testing system may be replaced.

Figure 18:
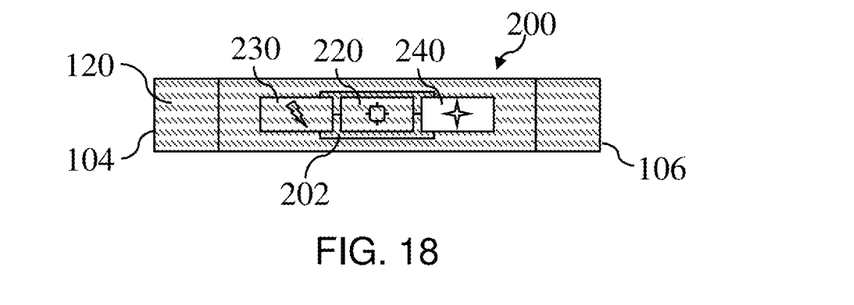
FIG. 18 is a schematic of a top of the armor plate system of FIG. 17.

FIG. 18 is a schematic of a top of the armor plate system 100 of FIG. 17. As shown in FIG. 18, the indicator 240 of the armor plate testing system 200 may be arranged to project out of the protective material 120 so that the indicator is visible to a user of the plate. Accordingly, the indicator 240 may be arranged to resist temperature fluctuations, submersion, and shock loading which may be experienced by the armor plate system during use. In some embodiments, the indicator 240 may be arranged as an auditory indicator which may be positioned underneath the protective material 120 or other housing.

Figure 19:
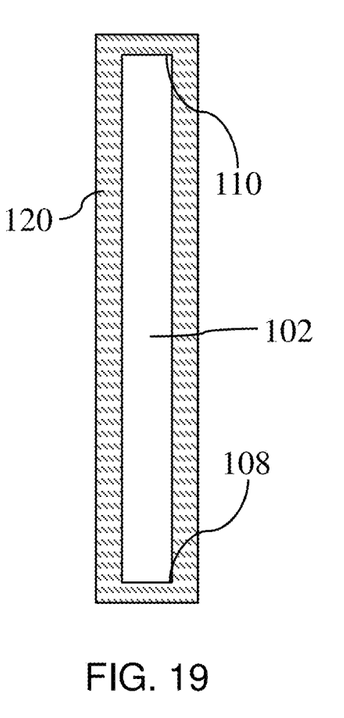
FIG. 19 shows a cross-sectional view of one embodiment of encapsulant surrounding a ceramic plate.

FIG. 19 shows a cross-sectional view of one embodiment of an encapsulant surrounding a ceramic plate 102. As shown in FIG. 19, protective material 120 may fully surround the ceramic plate 102. In the embodiment of FIG. 19, the protective material 120 is arranged as an encapsulant which fully encases the ceramic plate 102. The encapsulant may be a laminate, liner, or any suitable material used to protect a ceramic plate at any armor plate testing system components disposed underneath. In some embodiments, encapsulant may be sprayed onto the armor plate and/or armor plate testing system during a manufacturing process of the armor plate system.

Figure 20:
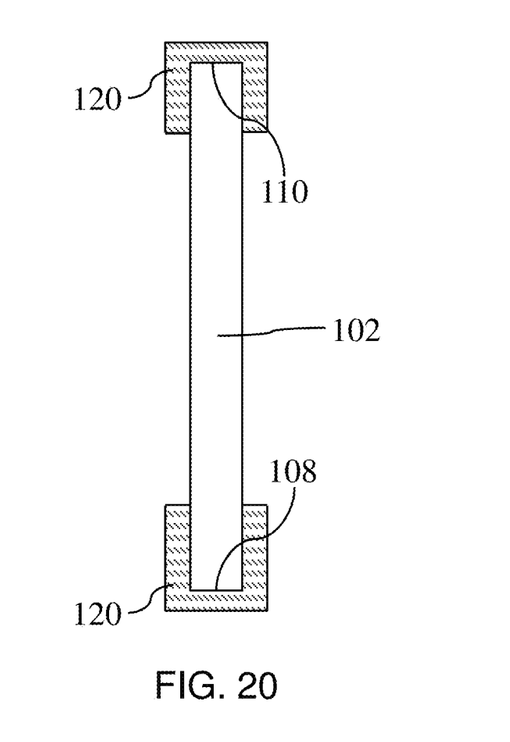
FIG. 20 shows a cross-sectional view of one embodiment of a protective lateral face guard surrounding a ceramic plate.

FIG. 20 is a cross-sectional view of one embodiment of a protective lateral face guard surrounding a ceramic plate 102. As shown in FIG. 20, protective material 120 is arranged as a protective lateral face guard which surrounds one or more lateral faces of the ceramic plate. According to this embodiment, the protective lateral face guard includes a U-channel which is arranged to fit over the lateral faces of the ceramic plate. As shown in FIG. 20, the protective lateral face guard is fit over the top lateral face 110 in the bottom lateral face 108 of the ceramic plate 102. The U-channel may provide an interference fit with the ceramic plate 102. In some embodiments, the U-channel may allow the protective lateral face guard to be removable from the ceramic plate. In other embodiments, the U-channels may be permanently fixed to the ceramic plate using adhesives, fasteners, and/or a tight interference fit.

Figure 21:
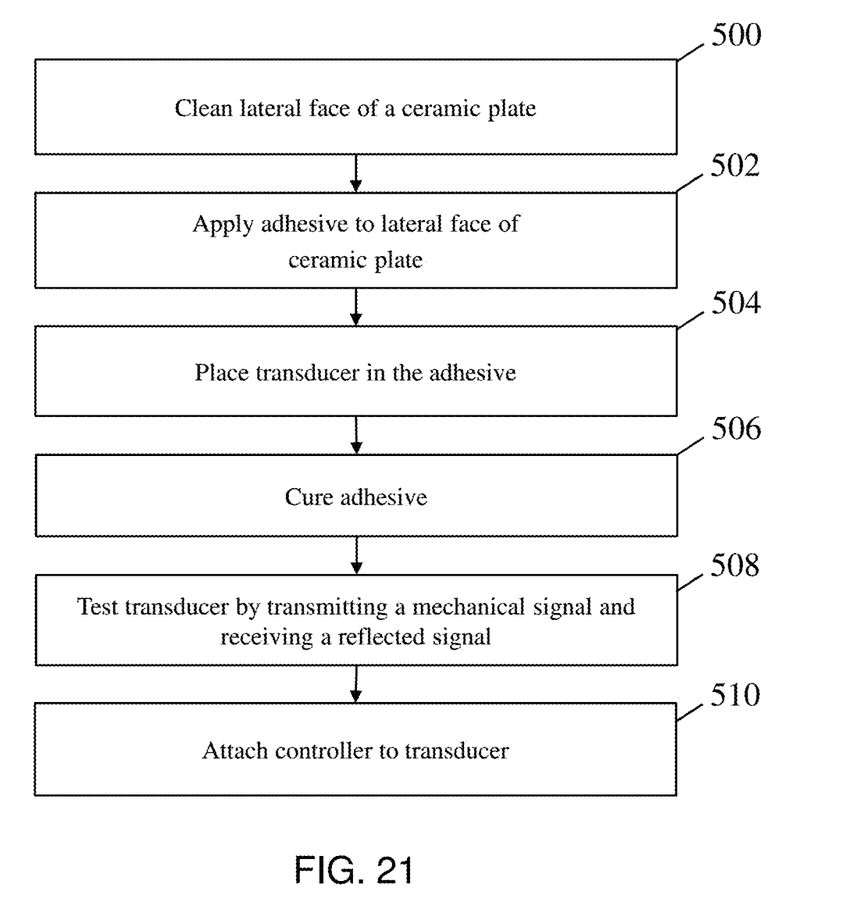
FIG. 21 is a block diagram of one embodiment of a method of manufacturing an armor plate system.

FIG. 21 is a flowchart of one embodiment of a method of manufacturing an armor plate system. In an act 500, a lateral face of the ceramic plate is cleaned. Cleaning a ceramic plate lateral face may include polishing, dusting, smoothing, and/or any other suitable process to prepare the ceramic plate lateral face for attachment of a transducer, such as a piezoelectric transducer. In an act 502, an adhesive is applied to the lateral face of the ceramic plate. The adhesive may be any suitable adhesive including but not limited to cyanoacrylates, epoxies, peel-and-stick adhesive tapes, and chemical, contact, or pressure activated adhesives. In an act 504, a transducer may be placed into the adhesive so that the transducer is in direct contact with the ceramic plate. In an act 506, the adhesive is cured so that the transducer is permanently attached to the ceramic plate. In an act 508, the transducer attached to the ceramic plate is tested by transmitting a signal to the ceramic plate receiving reflected signal from the ceramic plate. This test may serve as a baseline for a healthy plate from which future tests can be compared. In an act 510, armor testing circuitry is attached to the transducer. The armor testing circuitry may include a controller, a power source, and an indicator, as well as any other suitable electronic devices such as wireless transmitters that may be desirable for use with an armor plate testing system.

An ultrasonic transducer may be used in the embodiments disclosed herein. In some embodiments, the employed transducer is configured to respond to driver signals and receive a signal (ultrasonic or otherwise) with a rise or fall time that is faster than 33 µS.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An armor plate system, comprising:
   a protective plate;
   a testing system mounted inside a housing of the protective plate, wherein the testing system includes:
   a first transducer attached to a first lateral face of the protective plate and adapted to apply a mechanical signal to the protective plate at a first location during a test of the protective plate; and
   an indicator mounted inside the housing and visible from outside the housing to indicate a health state of the protective plate based on the test.

2. The armor plate testing system of claim 1, wherein the protective plate comprises a ceramic plate.

3. The armor plate system of claim 2, wherein the protective plate comprises a human body armor plate.

4. The armor plate system of claim 3, wherein the first transducer comprises a first piezoelectric transducer.

5. The armor plate system of claim 4, wherein the first piezoelectric transducer is a transmitter and a receiver.

6. The armor plate system of claim 4, further comprising a second piezoelectric transducer attached to a second lateral face, wherein the first piezoelectric transducer comprises a transmitter, the second piezoelectric transducer comprises a receiver, and the second piezoelectric transducer is positioned at a second location that is different than the first location.

7. The armor plate system of claim 4, further comprising a second piezoelectric transducer attached to the first lateral face, wherein the first piezoelectric transducer comprises a transmitter, the second piezoelectric transducer comprises a receiver, and the second piezoelectric transducer is positioned adjacent to the first location.

8. The armor plate system of claim 4, wherein the first piezoelectric transducer comprises an ultrasonic transducer.

9. The armor plate system of claim 4, wherein the first piezoelectric transducer is attached to the first lateral face with an adhesive.

10. The armor plate system of claim 9, wherein the adhesive comprises a cyanoacrylate.

11. The armor plate system of claim 1, further comprising a controller and a power source, connected to the first transducer, wherein the controller is configured to control the power source and the first transducer to apply the mechanical signal.

12. The armor plate system of claim 11, wherein the first transducer is configured to receive the mechanical signal at the first location, and the controller is configured to determine the health state of the protective plate based at least in part on analysis, by the controller, of a reflected portion of the mechanical signal sensed by the first transducer.

13. The armor plate system of claim 12, wherein the indicator includes a plurality of visual elements to indicate the determined health state of the protective plate including one of a first state corresponding to a broken or damaged plate, a second state corresponding to a partially damaged plate and a third state corresponding to a healthy plate.

14. The armor plate system of claim 13, wherein the indicator further includes an auditory indicator.

15. The armor plate system of claim 12, further comprising a digital transmitter connected to the controller and configured to receive, from the controller, information regarding the determined health state of the protective plate and to transmit the information related to the determined health state of the protective plate.

16. The armor plate system of claim 12, wherein the determined health state of the protective plate corresponds with damage to the protective plate that can hinder the ability of the protective plate to resist projectiles.

17. The armor plate system of claim 16, wherein the determined health state of the protective plate corresponds with damage to the protective plate that is not apparent from a visual inspection of the protective plate.

18. The armor plate system of claim 12, wherein the indicator includes multi-colored display elements to indicate the determined health state of the protective plate.

* * * * *

UNITED STATES PATENT AND TRADEMARK OFFICE
CERTIFICATE OF CORRECTION

PATENT NO. : 11,680,777 B2
APPLICATION NO. : 16/439451
DATED : June 20, 2023
INVENTOR(S) : Steve Carkner Page 1 of 1

It is certified that error appears in the above-identified patent and that said Letters Patent is hereby corrected as shown below:

In the Claims

At Column 14, Claim 2, Line 40:
"The armor plate testing system of claim 1, wherein the protective plate comprises a ceramic plate"
Should read:
-- The armor plate system of claim 1, wherein the protective plate comprises a ceramic plate --

Signed and Sealed this
Ninth Day of April, 2024

Katherine Kelly Vidal
*Director of the United States Patent and Trademark Office*